United States Patent Office 3,397,574
Patented Aug. 20, 1968

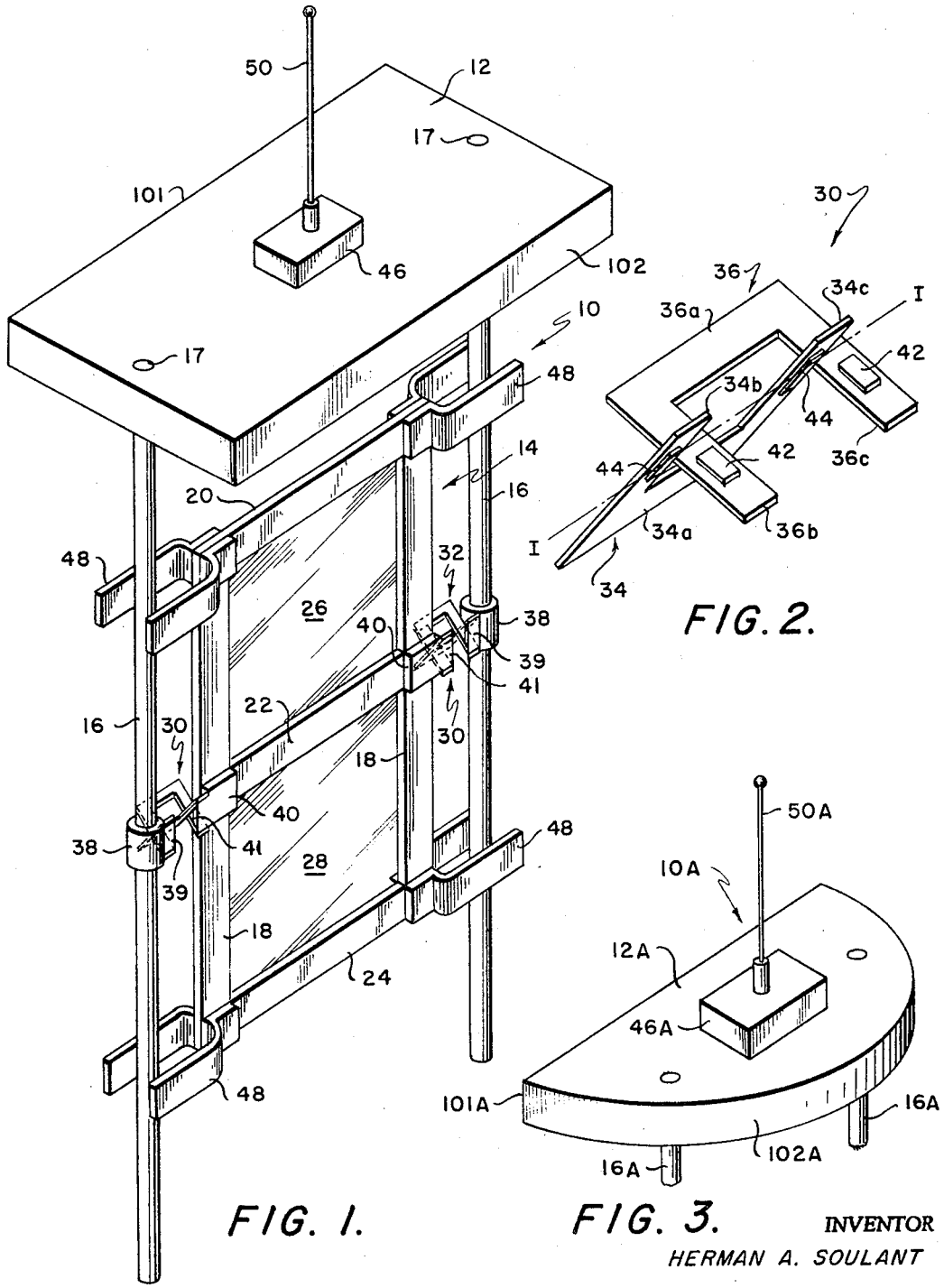

3,397,574
FLOAT FOR MEASURING WAVE CHARACTER-
ISTICS AND DIRECTION
Herman A. Soulant, Rockville, Md., assignor to the United
States of America as represented by the Secretary of
the Navy
Continuation-in-part of application Ser. No. 491,469,
Sept. 29, 1965. This application Nov. 14, 1967, Ser.
No. 682,840
21 Claims. (Cl. 73—170)

ABSTRACT OF THE DISCLOSURE

This disclosure relates to a buoy for measuring wave characteristics. The float member moves with the surface of the wave while the tender member remains relatively stationary. The oscillatory motion between the float member and the tender member is sensed for subsequent determination of wave direction, height, period, velocity, slope and acceleration. A magnetic sensing means is utilized to indicate the magnetic direction of the wave relative to the earth.

The invention described herein may be manufactured and used by or for the Government of the United States of America for governmental purposes without the payment of any royalties thereon or therefor.

*Cross reference to related application*

This application is a continuation-in-part of application Ser. No. 491,469, and now abandoned, filed Sept. 29, 1965, for a Float for Measuring Wave Acceleration, Slope and Direction.

*Background of the invention*

In ship design it is often necessary, when studying ways to improve ship performance, to obtain wave characteristics information from models and full-scale ships under test. Traditionally it is often advantageous for ships at sea to know in advance the sea conditions that they will encounter. The wave height, speed and direction will significantly affect the maximum speed attainable on a particular course. The necessary information for the above purposes is relatively easily obtained where a fixed vertical reference is available, i.e., in model towing tanks. Fixed probes, used under such circumstances, have been of various designs, using capacitive, resistive and sonic sensing means to determine wave height as a function of time from which wave length and period can be obtained. Wave direction is easily determined by visual observation.

Fixed probes are not usable where the water depth is great, i.e., at sea, and fixed probes must yield to inertia measurement devices which follow the movement of the waves. Prior art devices of this type have consisted of floats on which an accelerometer is fixedly mounted. If the float is designed so as to closely follow the wave motion, the output of the accelerometer doubly integrated will give wave height as a function of time. However, these prior art devices are unsatisfactory in that the float is incapable of giving the direction of wave travel. This defect limits the use of such devices to ships operating in the immediate area where wave direction can be determined by visual observation.

*Summary of the invention*

The present invention relates to a floating device for measuring wave characteristics and more particularly to a floating device capable of accurately determining a wave's acceleration, slope, height, period, direction and velocity.

It is an object of the invention to provide a float for measuring wave acceleration, slope and direction.

It is another object to provide a float for measuring wave acceleration, slope and direction that is capable of self alignment with the direction of the wave.

It is still another object to provide a float for measuring wave slope and direction that is capable of a predetermined self alignment with the direction of the wave.

It is a further object to provide a float for measuring wave acceleration, slope and direction that is capable of a high degree of accuracy.

A still further object is to provide a float for measuring wave acceleration, slope and direction that transmits complete sea-state information to a remote location.

It is a final object of the invention to provide a float to measure wave acceleration, slope and direction that includes novel means for sensing and transmitting the slope of a passing wave.

Other objects and many of the attendant advantages of this invention will be readily appreciated as the same becomes better understood by reference to the following detailed description of the first and second embodiments thereof when considered in connection with the accompanying drawings wherein:

FIG. 1 is a perspective view of the unique float of the invention;

FIG. 2 is an enlarged perspective view of one of the pivots shown in FIG. 1;

FIG. 3 is a perspective view of the second embodiment of this invention; and

*Detailed description*

Figure 4:
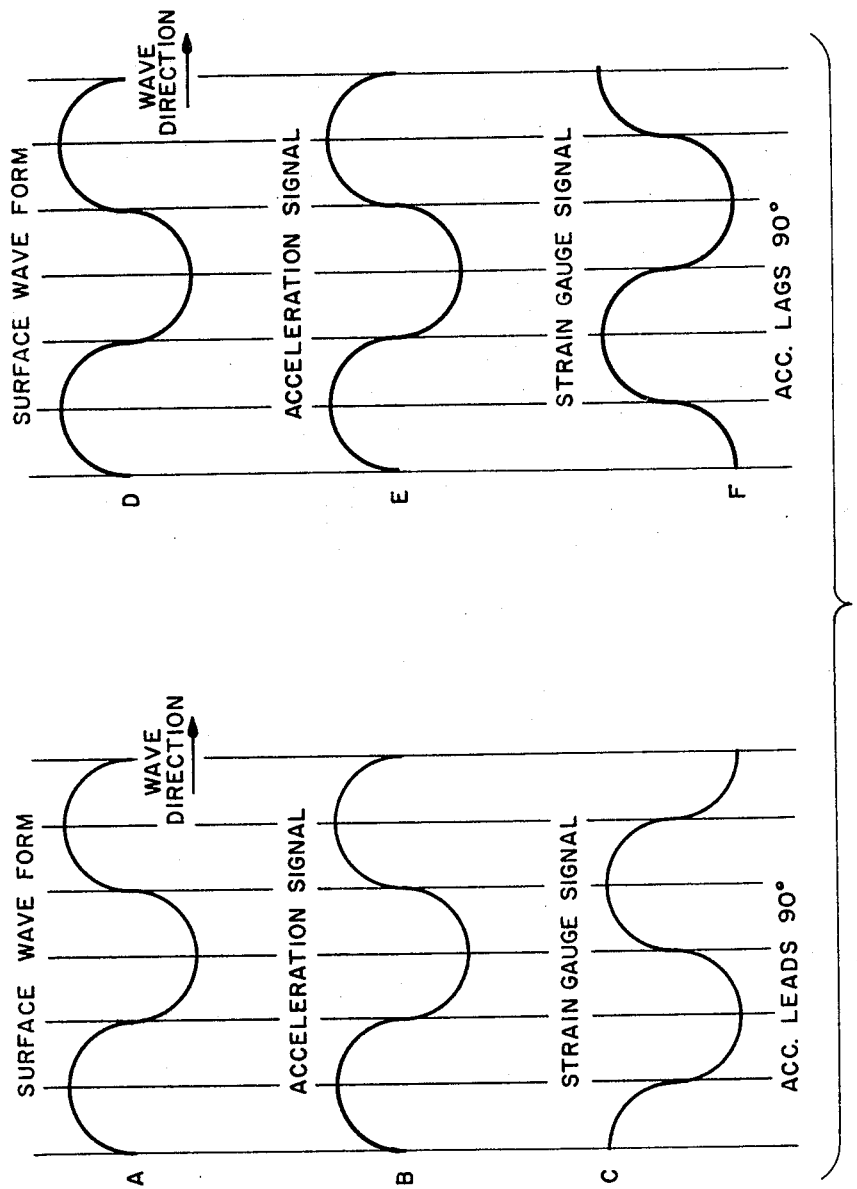
FIG. 4 shows characteristic surface wave forms and associated acceleration signals and strain gage signals.

Referring more particularly to FIG. 1 of the drawings, there is indicated by the reference numeral 10, a float embodying the principles and concepts of the present invention. The float 10 is comprised of a float means or float member 12 which will be explained more fully hereinafter. Float member 12 may be comprised of a horizontally elongated body having any suitable shape or configuration and, in this first embodiment of the invention, it takes the form of a rectangular parallelopiped which is, thus, both rectangular in shape and in cross-section. The float member 12 comprises longitudinal flat faces 101 and 102 for causing the float 10 to broach to and align either face 101 or face 102 perpendicular to the direction of the approaching wave, for reasons that will be explained more fully hereinafter. Float member 12, in this particular instance, is made of a buoyant material known commercially as "Styrofoam" although it will be appreciated that it could be made of any other suitable buoyant material or could consist of a sealed container made for example, of aluminum or "Fiberglas" reinforced plastic.

Float dimensions are chosen so that it will be "stiff," that is, follow closely the movement of the waves. The total mass supported and the buoyance of the float element must create a spring-mass system whose resonant frequency is higher than the highest wave frequency sought to be measured. For the relatively small waves generated in a model basin, such considerations would produce a float on the order of 3′ x 1¼′ and several inches thick. Floats used in open sea measurement would be on the order of 3′ x 6′ and be 6″ to a foot thick.

Depending from the float element are support elements or support members 16—16. The support members 16—16 in this one embodiment of the invention take the form of a pair of aluminum tubes or tubular elements, although it will be apparent that the support members could be made of any other suitable material and could assume any other suitable configuration or cross-section.

The material and configuration of the support members should be selected, however, to yield support members having lightness in weight, corrosion resistance and the necessary strength and load carrying capacity. The support members are received within a pair of holes or passages 17 in the float member 12 and are secured within the passages and to the float member by any suitable means (not shown). Passages 17 are positioned in support member 12 substantially along the longitudinal axis thereof so that the float member 12 and the depending supports 16 will constitute a substantially symmetrical and balanced assembly.

A tender element or tender member 14 is carried by the depending supports 16 and is rotatably connected to the supports 16 through the medium of a pair of flexible pivot means or pivot members 30—30, the structural details and the function of the pivot members 30—30 as well as the manner in which they are connected to the tender member 14 and supports 16 are to be discussed more fully in detail hereinafter.

The construction of the tender element is guided by considerations similar to those mentioned previously in regard to the support elements 16—16, this is, the tender element is made corrosion resistant and as light as possible without sacrificing the necessary stiffness. The solution chosen in the first embodiment for meeting these requirements is a frame formed of aluminum with panels carried by the frame and made of plastic film.

As best seen in FIG. 1, the aluminum frame of the tender member is substantially rectangular in shape and is comprised of aluminum horizontal stringers 20, 22 and 24 joined by suitable means to vertical stringers 18 and 19. Tautly stretched between and attached to the aluminum stringers are suitable plastic film panels 26 and 28. These plastic panels serve to complete the planar and substantially rectangular structure outlined by the stringers and make them watertight, without adding significantly to the supported weight. The size of the tender member will depend on the wave conditions contemplated in the area of study, but for use with the previously mentioned float member sized for use in a model basin (3′ x 1¼′), a tender member on the order of 2½′ x 4½′ would be satisfactory. For ocean use (3′ x 6′ float), a tender member of 5½′ x 6′ would perform satisfactorily. The reasons for selecting the above mentioned float and tender sizes will be discussed more fully hereinafter in connection with the practical and theoretical aspects of the operation of the present invention.

As mentioned hereinbefore, the tender member 14 is rotatably connected to the tubular depending supports 16—16 by the pair of flexible pivot members 30—30, the pivot members in this instance being positioned between vertical stringers 18 and the depending support members 16 and, thus, providing a flexible or resilient connection between the tender member and the depending supports. Each pivot member 30 is comprised of a pair of flat, substantially U-shaped resilient elements 34 and 36 which, in this first embodiment of the invention, are made of a suitable non-corrosive spring steel. U-shaped element 34 is comprised of a bight portion 34a in combination with two opposing leg portions 34b and 34c, and U-shaped element 36 is similarly comprised of a bight portion 36a in combination with a pair of opposing by portions 36b and 36c. Both U-shaped elements 34 and 36 in each pivot member 30 are substantially identical in size, configuration and cross-section.

In providing a resilient connection, the U-shaped elements 34 and 36 of both pivot members 30 are operatively connected, in this preferred embodiment of the invention, to the tender member 14 and the depending supports 16—16 in such a manner that the U-shaped members 34 and 36 are arranged or oriented substantially normal to each other with the leg portions of one member being disposed in close proximity to the leg portions of the other, the leg portions thus being arranged in pairs in scissor-like fashion. Stated in another manner, the U-shaped members 34 and 36 are arranged or oriented such that they lie in two planes which intersect each other at substantially a right angle with the planes intersecting each other along a line intermediate the ends of the leg portions of the U-shaped members. Line I—I in FIG. 2 illustrates such a line of intersection in this first embodiment of the invention.

As best seen in FIG. 1, both resilient pivot members 30 are identical in construction and are both operatively connected to the tender member 14 and depending supports 16—16 in the same structural manner, with the exception of course that the leg portions of the U-shaped members are reversed in position. For the sake of brevity, only one of such operative connections for the pivot members 30—30 will be discussed herein.

Referring particularly to pivot member 30 at the right of the float in FIG. 1, pivot member 30 is connected to depending support member 16—16 through the medium of a collar means or collar 38 carried by the support member, the collar 38 being rigidly attached to the support member 16 by any suitable means (not shown) and carried thereon in a predetermined position or at a preselected distance below float member 12. Collar 38 is provided with a projection or tang 39 thereon to the ends of which are connected the leg portions 34c and 36c of U-shaped members 34 and 36, respectively. The leg portions 34c and 36c are rigidly connected to the tang 39 by any suitable means such as welding (beads not shown), and it will be appreciated that the dimensions of the tang must be selected such that the tang will have sufficient width to accommodate both leg portions of the U-shaped members and have sufficient length to maintain the desired angular relationship between the U-shaped members when the U-shaped members are attached thereto. It will also be noted that the ends of tang 39 are beveled or chamfered to a degree consistent with the angular relationship that is desired to be maintained between the U-shaped members 34 and 36.

The leg portions 34b and 36b of the U-shaped members are similarly connected to the tender member 14 through the medium of a fitting 40 carried by the tender member, the fitting 40 also having a projection or tang 41 thereon. Fitting 40 is fixedly secured at a distance below the float member 12 equal to the distance that collar 38 is located below the float member and the projection or tang 41 is of the same length and has ends beveled in the same manner as tang 39. On these beveled ends are mounted the legs 34b and 36b of the hereinbefore described U-shaped members 34 and 36.

The pivot elements allow rotation of the tender member over a limited angular range but with extremely low frictional resistance and apply light spring pressure to restore the tender element into parallelism with the supports 16—16 after it has been displaced. Any suitable bearing combined with a suitable spring arrangement could be made to function satisfactorily but the flexure pivot members 30 are most satisfactory because of the virtual elimination of bearing friction, the adaptability to strain guage-rotation sensing, and the ability to operate unsealed and without lubricants.

The flexure pivots are protected from excessive rotation of the tender member by the provision of limit stops 48 mounted on frame 14.

As shown in FIG. 2, pivots 30—30 ar provided with strain gauge sets 42 and 44 mounted on the four legs of the two U-shaped members 34 and 36 so that they will be flexed when the tender element rotates. Suitable wiring (not shown) connects the strain gauges or other rotation sensors to the electronics package 46.

The electronics package 46 includes an earth magnetic direction sensor, an accelerometer and a transmitter with appropriate modulation. Antenna 50 is of the type used when relatively short range VHF communications are satisfactory.

The float's operation will be discussed along with some of the many modifications possible within the concept of the present invention.

As was mentioned hereinbefore, the float 12 is made highly buoyant and the weight it supports kept as low as possible. This making of the float "stiff", is important because then as it closely follows the surface of a wave the tender member 14 which is normally held in a position parallel to supports 16 by the light spring pressure of the flexure pivots will be displaced relative thereto (the tender member is held stationary by the high movement of inertia due to the virtual mass cylinder of water affected by the panel 14). The virtual mass cylinder of water surrounding the tender element is employed rather than a true high inertia cylinder because the virtual cylinder has little effective movement vertically and allows good vertical motion response for the float. Thus the tender element assumes a position that is the average of the angular positions of the float and thereby provides the requisite vertical reference.

In order for the float to be accurately responsive to the wave conditions it encounters, the spring-mass system comprising the vertical mass cylinder and the spring flexures must have a natural resonance which is lower than the lowest frequency of the waves to be measured. For the low frequency ocean waves a large mass cylinder (and therefore a large tender member) and low flexure stiffness is required. For waves encountered in a model basin both lower mass cylinder and higher flexure stiffness would be allowable.

When the float and tender elements are angularly displaced from each other the bending of the flexure elements causes the electrical resistance of the strain gauges to change, i.e., a strain gauge in tension will increase the electrical resistance while a strain gauge in compression will decrease the electrical resistance. (It should be understood that although the system is described as using strain gauges it would be posible to use other transducers as well, for example, differential transformers or rheostats.) FIG. 4 illustrates a surface wave approaching the float 10 from one side, FIG. 4A, then from the other side, FIG. 4D. It is to be noted that the acceleration signal is in phase with the surface wave form regardless of the direction of the surface wave. FIGS. 4C and 4F represent the signal from a single strain gauge. Thus, when the surface wave approaches the float 10 from one side, FIG. 4A, the acceleration signal, FIG. 4B, will lead the strain gauge signal, FIG. 4C by a phase relationship of 90°. Also, when the surface wave approaches the float member from the opposite side, FIG. 4D, the acceleration signal, FIG. 4E, will lag the strain gauge signal, FIG. 4F, by 90°. Thus, the phase relationship between the acceleration signal and a preselected strain gauge and the corresponding strain gauge signal will indicate whether the waves are approaching the float on the longitudinal side 101 or longitudinal side 102. The sensed strain gauge signal is modified by electrical conditioning means and used to modulate the transmitting means. Also modulating the transmitter through conditioning means with a time-shared, subcarrier or other suitable modulation system are the aforementioned earth magnetic direction sensor and accelerometer.

The long axis of the float, as is well known with floating bodies, lines up with the wave front and the magnetic direction sensor's output is therefore directly related to the orientation to magnetic north. The magnetic direction sensor output provides the necessary information to determine the longitudinal axis of the float relative to the earth's magnetic pole and thereby determine the wave direction at a remote point. A float so equipped can not only indicate the direction of a regular sea but can distinguish a confused sea from a regular sea.

The final instrumentiation that modulates the transmitter is a linear accelerometer. This may be of any of several known types, for example, that shown in U.S. Patent No. 3,110,178 to Marks et al. The accuracy of the acceleration indication is not critical since it is needed primarily to resolve a 180° ambiguity as to wave direction as previously explained.

The form taken by the transmitter may vary according to the specialized use for which the buoy is intended. For example, for close range work (as in a model basin) a modulated light source may suffice, for intermediate ranges (10 to 12 miles) a VHF transmitter and antenna, as shown in FIG. 1, would be adequate and for the longest ranges of contemplated use (several hundred miles) tropospheric scatter transmission may be employed.

The raw information of slope, direction and acceleration is received at a point distant from the buoy. There integration of the slope signal will yield wave height indication. Fitting a curve to the slope-time information (assuming sinusoidal wave shape) will allow determination of wave spacing and speed. The phase relationship between the accelerometer signal and the strain gauge signal, as was previously explained, will indicate whether the wave is approaching float side 101 or float side 102 and thereby resolve the 180° wave direction ambiguity. Finally, the signal from the magnetic direction sensing will indicate the direction of the wave relative to the earth.

Referring to the second embodiment of the invention, FIG. 3, there is indicated by the reference numeral 10a, a float embodying principles and concepts of the present invention. The float 10a is comprised of the float means or float member 12a which will be explained more fully hereinafter. Depending from the float member 12a are support elements 16a—16a and the tender member 14a (not shown) which is carried by the depending supports 16a—16a. It is to be understood that the tender member 14a, depending supports 16a—16a and their associated elements are essentially the same as tender member 14, supports 16—16 and the associated elements of float 10, respectively. The electronics package 46a includes an earth magnetic direction sensor, a transmitter with appropriate modulation but not an accelerometer for reasons as will become apparent. Antenna 50a similar to antenna of 50, is of the type used when relatively short range VHF communications are satisfactory.

Float member 12a, similarly constructed as float member 12, may comprise of any hydrodynamic shape that will cause a predetermined portion of said float to align itself perpendicular to (or broach to) the approaching waves and is illustratively shown as a semi-circular cylinder having a flat face 101a and a rounded face 102a. When the float 10a is placed in the water the movement of the waves will cause face 101a to align itself perpendicular to the direction of the approaching wave, i.e., the longitudinal flat face 101a of the float 10 will broach to the wave. Thus, the acceleration of the float is no longer a necessary factor in the determination of the wave directions since it is known that only face 101a will align itself perpendicular to the direction of the oncoming waves.

The strain gauge signal, which is also the slope signal, is utilized to determine the wave height, period and velocity, as is similarly done with the slope signal of float 10. Finally, the signal from the magnetic direction sensor will indicate the direction of the waves relative to the magnetic pole of the earth.

In summary, what is provided is a wave measuring float capable, through unique structure, of obtaining a measurement of all the important wave characteristics and transmitting them to a remote receiving station where they may be interpreted.

Obviously, many modifications and variations of the present invention are possible in the light of the above teachings. It is, therefore, to be understood that within the scope of the appended claims the invention is specifically described.

What is claimed is:

1. A floating device for measuring wave characteristics comprising:
   a float member;
   a tender member located below said float member;
   a support member connecting said float member and said tender member;
   means mounting said tender member on said support member for reciprocative rotation about a horizontal axis relative to said support member; and
   means for indicating the relative rotation between said tender member and said support member.

2. The floating device according to claim 1 wherein said support member also includes means for limiting the degree of rotation permitted.

3. The device according to claim 2 wherein the means for limiting the degree of rotation comprise fixed stops mounted on the support member.

4. The device according to claim 1 wherein said device further includes means for transmitting to a distant point said sensed rotation.

5. The device according to claim 1 wherein said tender member comprises means acting on a virtual cylinder of water.

6. The device according to claim 5 wherein said mounting means further comprises at least one spring flexure pivot.

7. The device according to claim 1 wherein said tender member is a rectangular panel.

8. The device according to claim 1 wherein said float member is elongated in the horizontal plane.

9. The device according to claim 1 wherein said indicating means includes at least one strain gauge to provide an electrical signal.

10. The device according to claim 9 wherein said device further includes accelerometer means for sensing the acceleration of said float member and providing an electrical signal corresponding to said acceleration, whereby the phase relationship between said sensed acceleration signal and said strain gauge signal is utilized to resolve ambiguity in determining the wave direction relative to said float.

11. The device according to claim 10 further including means for sensing the direction of the earth's magnetic field to determine the orientation of the float and the direction of the wave relative to the earth's magnetic field.

12. The device according to claim 11 wherein said device further includes means for transmitting to a distant point said acceleration signal, said strain gauge signal and said orientation signal.

13. The device according to claim 12 wherein said float member is rectangularly shaped.

14. The device according to claim 9 further including means for sensing the direction of the earth's magnetic field to determine the orientation of the float and the direction of the wave relative to the earth's magnetic field.

15. The device according to claim 14 further includes means for transmitting to a distant point said strain gauge signal and said orientation signal.

16. The device according to claim 15 wherein said float member is hydrodynamically shaped so as to define a singular predetermined portion of said float member that will broach to the approaching waves.

17. A floating device for measuring wave characteristics comprising:
   an elongated float member;
   a tender member having a high rotational inertia located below said float member;
   a support member connected to said float member and downwardly depending from said float member;
   a pivot member connecting said support member and said tender member; and
   means for indicating the relative rotation between said tender member and said support member.

18. The device of claim 17 wherein said sensing means comprises strain gauges mounted on said pivot member.

19. The device of claim 17 further including means for sensing the direction of the earth's magnetic field to determine the orientation of the float.

20. The device of claim 19 further including an acceleration sensor to resolve the 180° ambiguity of the magnetic field sensing means.

21. The device of claim 20 further including means to sense the relative rotational position of said tender member to said float member; and
   transmitting means with an output sensitive to variations in the rotation, magnetic field and acceleration sensors.

References Cited

UNITED STATES PATENTS 2,766,622    10/1965    Johnson.
3,301,048    1/1967    Felsenthal.

RICHARD C. QUEISSER, *Primary Examiner.*

JERRY W. MYRACLE, *Assistant Examiner.*